US008782633B1

(12) United States Patent  
Tamilarasan et al.

(10) Patent No.: US 8,782,633 B1
(45) Date of Patent: Jul. 15, 2014

(54) UPGRADING FIRMWARE OF A POWER SUPPLY

(75) Inventors: Ashok Tamilarasan, Shrewsbury, MA (US); Gregory Bailey, Easthampton, MA (US); Michael Manning, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 365 days.

(21) Appl. No.: 13/238,646

(22) Filed: Sep. 21, 2011

(51) Int. Cl.
*G06F 9/44* (2006.01)

(52) U.S. Cl.
USPC ........................... 717/173; 717/168; 717/178

(58) Field of Classification Search
USPC .......... 717/168–178; 711/114–118, 147–162; 714/5.1, 33, 47.3
See application file for complete search history.

(56) References Cited

U.S. PATENT DOCUMENTS 5,588,143 A * 12/1996 Stupek et al. .................. 703/20
7,890,427 B1 * 2/2011 Rao et al. ...................... 705/51
2003/0217257 A1 * 11/2003 Ebsen et al. ................... 713/100
2008/0046877 A1 * 2/2008 Ford .............................. 717/168
2008/0086652 A1 * 4/2008 Krieger et al. ................ 713/330

OTHER PUBLICATIONS

Kallahalla et al., SoftUDC: A Software-Based Data Center for Utility Computing, IEEE, 2004, pp. 38-46.*
Muppalaneni et al., A Multi-tier RAID Storage System with RAID1 and RAID5, IEEE, 2000, pp. 1-9.*
Gracioli et al., An Operating System Infrastructure for Remote Code Update in Deeply Embedded Systems, ACM 2008, pp. 1-5.*

* cited by examiner

*Primary Examiner* — Satish Rampuria
(74) *Attorney, Agent, or Firm* — Krishnendu Gupta; Jason A. Reyes (57) ABSTRACT

A method, a system and a computer program product for upgrading firmware is disclosed. In one embodiment data storage is managed in a data storage system comprising a first enclosure having a first storage processor and a first power supply. A firmware upgrade is saved in the first storage processor. The firmware upgrade in the first storage processor and firmware in the first power supply are compared. The firmware upgrade is downloaded to the first power supply in response to the comparison determining a difference between the firmware upgrade in the first storage processor and the firmware in the first power supply. The firmware is upgraded in the first power supply with the firmware upgrade.

8 Claims, 9 Drawing Sheets

UPGRADING FIRMWARE OF A POWER SUPPLY

BACKGROUND

1. Technical Field

This application relates to upgrading firmware.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A typical data storage system includes one or more rack systems, each rack system having a plurality of storage devices or enclosures. A common topology in which the enclosures are connected is a loop. Communication signals traverse the loop uni-directionally and pass from enclosure to enclosure in a daisy-chain fashion. Enclosures receiving communication signals targeted to another enclosure forward those signals along the loop.

SUMMARY OF THE INVENTION

A method, a system and a computer program product for upgrading firmware is disclosed. In one embodiment data storage is managed in a data storage system comprising a first enclosure having a first storage processor and a first power supply. A firmware upgrade is saved in the first storage processor. The firmware upgrade in the first storage processor and firmware in the first power supply are compared. The firmware upgrade is downloaded to the first power supply in response to the comparison determining a difference between the firmware upgrade in the first storage processor and the firmware in the first power supply. The firmware is upgraded in the first power supply with the firmware upgrade.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is a flowchart of processing steps that may be performed in an embodiment in accordance with techniques herein;

DETAILED DESCRIPTION OF EMBODIMENT(S)

The invention can be implemented in numerous ways, including as a process, an apparatus, a system, a composition of matter, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is described below a technique for use in upgrading firmware. Each individual enclosure of a Storage System comprises power supplies having firmware that can be upgraded. The upgrade of the firmware can cause the power supplies to reset for the upgraded firmware to take effect. The technique described herein has the ability to upgrade without the loss of enclosure functionality and thus preventing the Data Unavailable ("DU") situation. It coordinates with the peer storage processor to perform the upgrade of the power supply in a lock step fashion so that one power supply is upgraded at a time. Since the power supply reset is a temporary step, the code can handle the reset case and make it transparent to the outside world. Each enclosure has multiple components that can be upgraded (e.g. LCCs, Fans, Power Supplies etc.,) and this technique can also take care of prioritizing multiple upgrades and keep them isolated as much as possible.

Conventionally, the power supply firmware upgrade was an off shelf upgrade which was very disruptive and costly.

The technique herein coordinates with peer to perform online firmware upgrade and do the power supply upgrade in a lock step fashion. In a case of an enclosure having just single power supply, the technique is tied in with the enclosure reset ride through logic, as will be described below, to make the reset transparent to the user and thus preventing DU situation.

Figure 1:
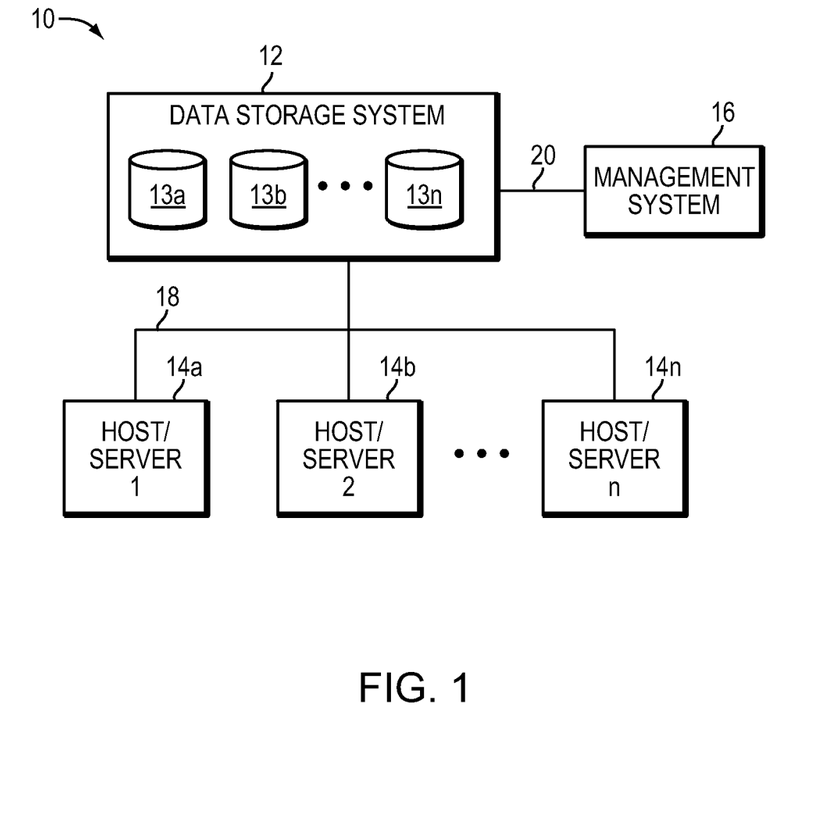
FIG. 1 is an example of an embodiment of a system that may utilize the techniques described herein.

Referring to FIG. 1, there is illustrated an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
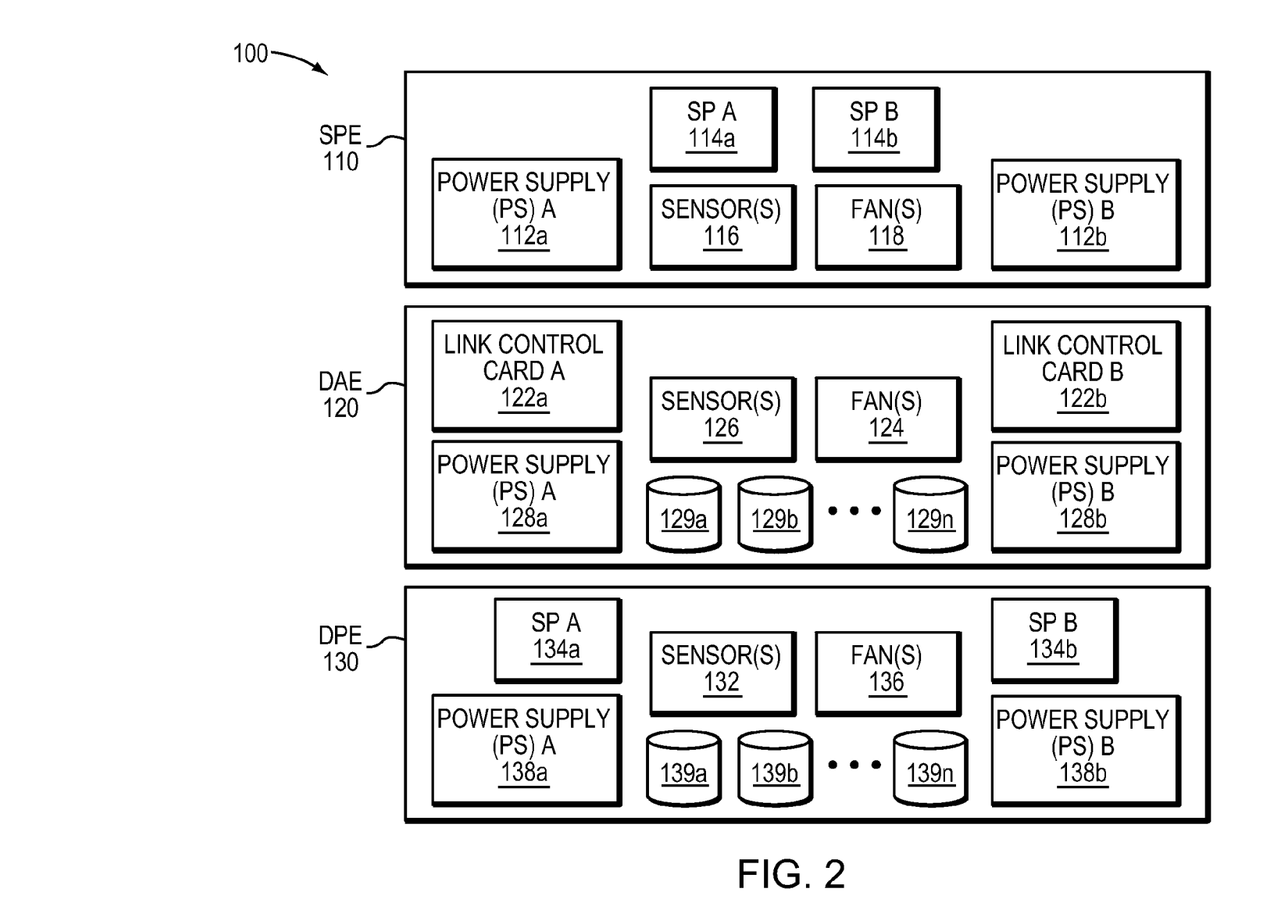
FIG. 2 is an example illustrating different enclosures and components thereof that may be included in an embodiment in accordance with techniques herein.

Referring to FIG. 2, there is illustrated an example of different types of enclosures that may be included in an embodiment of a data storage system in accordance with techniques herein. The example 100 includes a storage processor enclosure (SPE) 110, a disk array enclosure (DAE) 120, and a disk array processor enclosure (DPE) 130. A data storage system may include, for example, an SPE and one or more DAEs, or a DPE and one or more DAEs.

An SPE 110 may include storage processors ("SPs") or central processing units ("CPUs") of the data storage system. In one embodiment, the SPE 110 may include two SPs denoted as SPs A and B (114a, 114b). The SPE 110 may also include two enclosure power supplies, power supply (PS) A 112a, PS B 112b, one or more sensors 116, and one or more fans 118. PS A 112a and PS B 112b may supply power to the components of the SPE 110. PS A 112a and PS B 112b may be powered by an external or primary power source, such as AC power provided by a source external with respect to the data storage system. The sensors 116 may include a temperature sensor that records the ambient temperature for the SPE 110. The SPE 110 may include other components than as illustrated in the example 100 for use with techniques herein.

A DAE 120 may include data storage devices of the data storage system. In one embodiment, the DAE 120 may include data storage devices 129a-129n, link control card (LCC) A 122a, LCC B 122b, one or more sensors 126, power supply (PS) A 128a, PS B 128b, and one or more fans 124. PS A 128a and PS B 128b may supply power to the components of the DAE 120. PS A 128a and PS B 128b may be powered by an external or primary power source, such as AC power provided by a source external with respect to the data storage system. The sensors 126 may include a temperature sensor that records the ambient temperature for the DAE 120. The DAE 120 may include other components than as illustrated in the example 100 for use with techniques herein. Each of the LCCs 122a, 122b may function as the interface between the components within the DAE and components outside or external to the DAE. As will be described in following paragraphs, another enclosure, such as the SPE, may be connected to, and communicate with, the DAE through the LCCs 122a, 122b.

A DPE 130 may include storage processors ("SPs") or central processing units ("CPUs") and also storage devices of the data storage system. In one embodiment, the DPE 130 may include two SPs denoted as SPs A and B (134a, 134b).

The DPE 130 may also include two enclosure power supplies, power supply (PS) A 138a, PS B 138b, one or more sensors 132, one or more fans 136, and data storage devices 139a-139n. PS A 134a and PS B 134b may supply power to the components of the DPE 130. PS A 134a and PS B 134b may be powered by an external or primary power source, such as AC power provided by a source external with respect to the data storage system. The sensors 132 may include a temperature sensor that records the ambient temperature for the DPE 130. The DPE 130 may include other components than as illustrated in the example 100 for use with techniques herein.

It should be noted that the one or more sensors of an enclosure may provide for obtaining one or more temperature measurements. As described above, a sensor may be used to record ambient temperature of air flowing into and/or surrounding the enclosure (e.g., indicative of the temperature of air external to the enclosure). A sensor may also be used to record the temperature within the enclosure. An embodiment may include one or more of the foregoing temperature sensors. Additionally, the power supplies within the enclosures illustrated in FIG. 2 may include an integrated sensor for sensing and reporting the amount of power utilized. However, an embodiment may alternatively include a power sensor as a separate sensor which is not integrated with the power supplies.

The data storage devices (e.g., denoted 129a-129n of the DAE 120 and 139a-139n of the DPE 130) may be any one or more types of data storage devices or drives having different data storage device characteristics. For example, in one embodiment, an enclosure may include FC (fibre channel) disk drives, SATA disk drives, or solid state drives (SSDs) such as flash-memory based storage drives. The number and/or type of devices included in an enclosure may also vary with the particular enclosure and/or embodiment.

In some embodiments in accordance with techniques herein, the data storage system may have two or more SPs. In one embodiment in which a data storage system has two SPs, the data storage system may include either the SPE or the DPE in combination with one or more DAEs. A DAE and a DPE may each have two enclosure power supplies and an SPE may have 2 or 4 enclosure level power supplies (although two are illustrated in elements 110 for exemplary purposes). As noted above, each such enclosure level power supply (PS) such as denoted by elements 112a, 112b, 128a, 128b, 138a and 138b, may be a primary power source such as AC power for components of the enclosure. Each PS of an enclosure may have two internal fans or blowers which are integrated with the PS as a single unit. Each enclosure may have 2-4 external fans. It should be noted that the foregoing numbers of components such as fans, CPUs or SPs, power supplies, and the like, are examples of what may be included in an embodiment in accordance with techniques herein.

As described in more detail below, a SP or CPU of an SPE or DPE may connect to a DAE through an LCC of the DAE. The enclosures as illustrated may include replicate hardware components, such as two or more enclosure level power supplies, a DAE which includes two LCCs, an SPE or DPE including two SPs or CPUs, and the like. In an embodiment where an enclosure includes two SPs or CPUs, two LCCs and the like, a first of each of the pair may be denoted as the "A" components and a second of the pair may be denoted as the "B" components.

Figure 3:
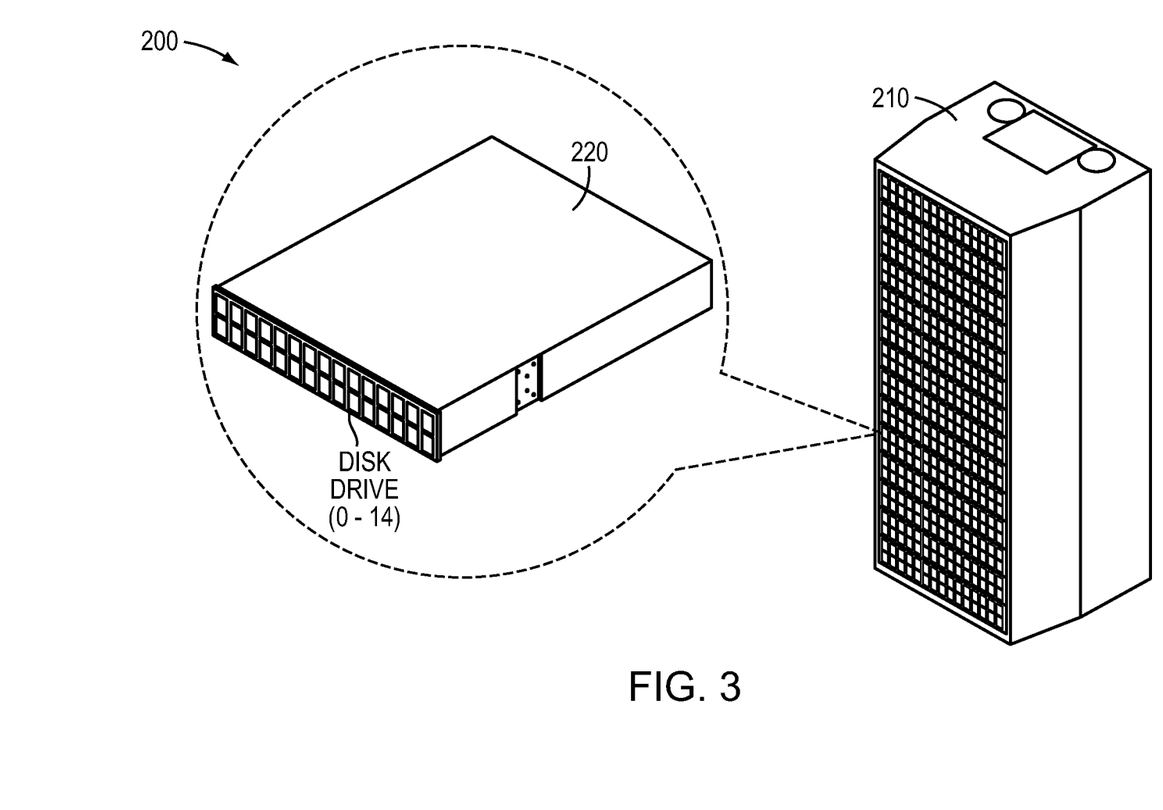
FIG. 3 is an example illustrating an arrangement of enclosures in a rackmount arrangement.

Referring to FIG. 3, there is illustrated an example configuration of a data storage system in accordance with techniques herein. The example 200 illustrates an exemplary rack mount configuration where the enclosures are included in racks in a rackmount cabinet 210. Each rack may include one of the enclosures such as illustrated by 220 where the enclosure may be a DAE illustrated as including disk drives 0-14. The different enclosures included in a data storage system may be connected to each other in a variety of different arrangements.

Figure 4:
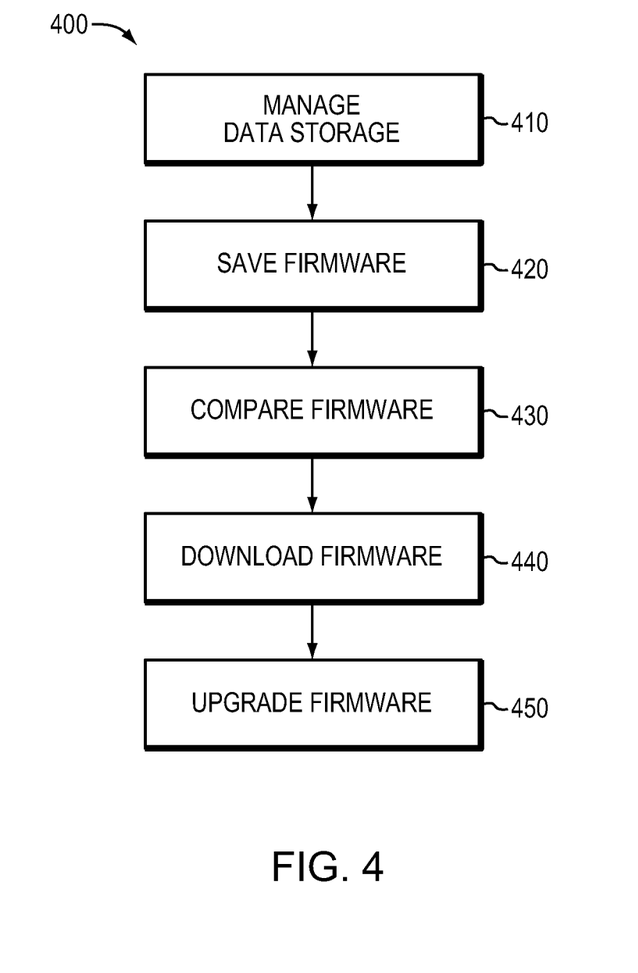
FIG. 4 is a flowchart of processing steps that may be performed in an embodiment in accordance with techniques herein.

Referring to FIG. 4, there is illustrated a technique for use in upgrading firmware. The technique indicated generally by the reference numeral 400 comprises managing 410 data storage in a data storage system comprising a first enclosure having a first storage processor and a first power supply. In one embodiment, the technique described herein can be performed by logic operating on the first enclosure. The technique comprises saving 420 a firmware upgrade in the first storage processor of the first enclosure. The technique comprises comparing 430 the firmware upgrade in the first storage processor and existing firmware in the first power supply. The technique comprises downloading 440 the firmware upgrade to the first power supply in response to the comparison determining a difference between the firmware upgrade in the first storage processor and the existing firmware in the first power supply. For example, the firmware upgrade may be downloaded to the power supply buffer of the first power supply in response to the comparison determining a difference between the firmware upgrade in the first storage processor and the existing firmware in the first power supply. The technique also comprises upgrading 450 the firmware in the first power supply with the firmware upgrade. In one embodiment, upgrading the firmware comprises resetting the first power supply for enabling the firmware upgrade in the first power supply.

It will be appreciated that there may be many instances when it is necessary to upgrade firmware in the first power supply. For example, the first power supply may include an integrated temperature sensor as well as having existing firmware directed to measuring ambient temperature. In one embodiment, the firmware upgrade saved in the first storage processor may be further directed to automatic shut down when the sensor detects a certain temperature. It will be appreciated that the technique may be configured to detect or determine such a difference between the firmware. It will also be appreciated that the technique may be configured to download the firmware upgrade to the first power supply in response to determining the difference and upgrading the firmware in the first power supply with the firmware upgrade.

Figure 5:
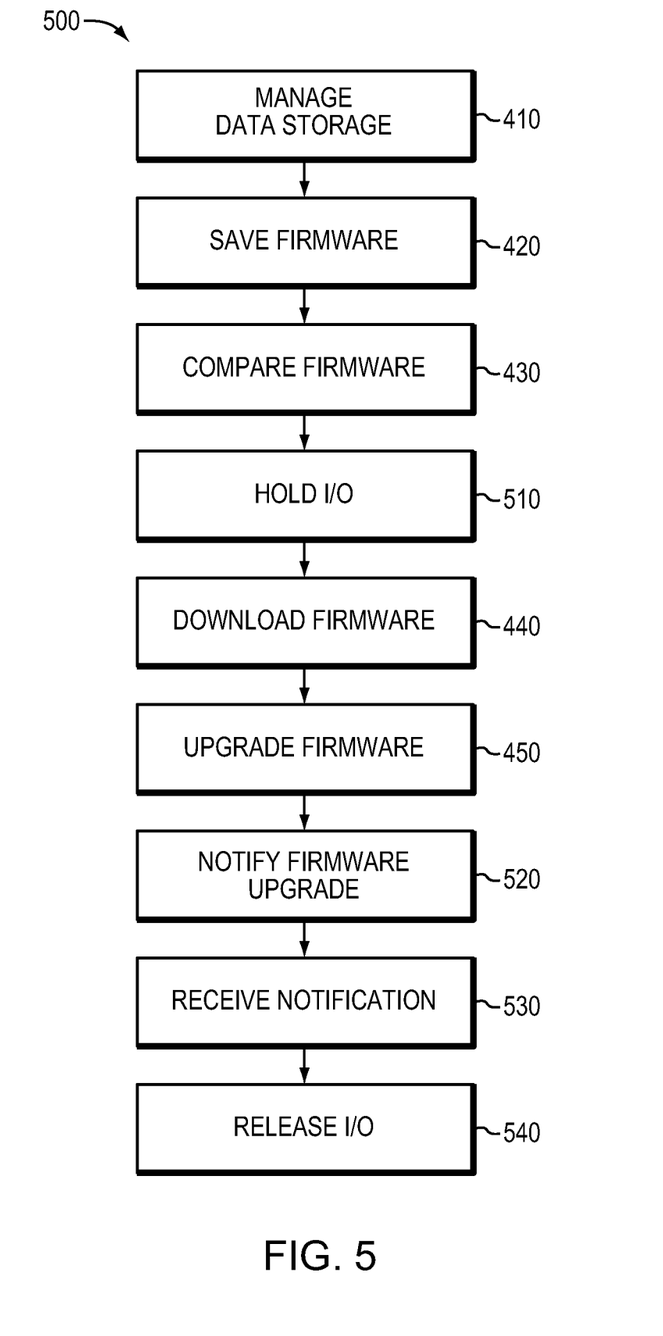
FIG. 5 is a flowchart of processing steps that may be performed in an embodiment in accordance with techniques herein.

Referring to FIG. 5, there is illustrated another technique for use in upgrading firmware. The technique is indicated generally by the reference numeral 500 and is substantially similar to the technique 400 as discussed previously. The technique comprises similar steps and such steps are identified by similar reference numerals. The technique comprises managing 410 data storage in a data storage system comprising a first enclosure having a first power supply and a first storage processor. In one embodiment the technique described herein can be performed by logic operating on the first enclosure. The technique comprises saving 420 a firmware upgrade in the first storage processor of the first enclosure. The technique comprises comparing 430 the firmware upgrade in the first storage processor and the existing firmware in the first power supply. The technique comprises holding 510 Input/Output (I/O) operations associated with the first enclosure in memory in the first storage processor in response to the comparison determining a difference between the firmware upgrade in the first storage processor and the firmware in the first power supply. For example, the I/O operations may be write I/O and read I/O. Additionally, the technique comprises downloading 440 the firmware upgrade to the first power supply in response to the comparison determining a difference between the firmware upgrade in the first storage processor and the firmware in the first power supply. For example, the firmware upgrade may be downloaded to the power supply buffer of the first power supply. Furthermore, the technique comprises upgrading 450 the firmware in the first power supply with the firmware upgrade. It will be appreciated that the first power supply may be upgraded in response to the download being successfully completed. In another embodiment the technique comprises notifying 520 memory in the first storage processor of the firmware upgrade in response to the completion of the firmware upgrade. In a further embodiment, the technique comprises receiving 530 the notification of the firmware upgrade. In a still further embodiment, the technique comprises releasing 540 the I/O operations from memory in the first storage processor in response to the receipt of the notification of the firmware upgrade.

It will be appreciated by those skilled in the art that one of the advantages of the above technique is that by holding 510 the I/O operations the enclosure avoids the Data Unavailable (DU) situation caused by the first power supply resetting for the firmware upgrade to take effect. The holding step can be performed by enclosure reset ride through logic operating on the enclosure. However, the holding step may be rendered superfluous in the event that data in cache can deal with the I/O operations.

Figure 6:
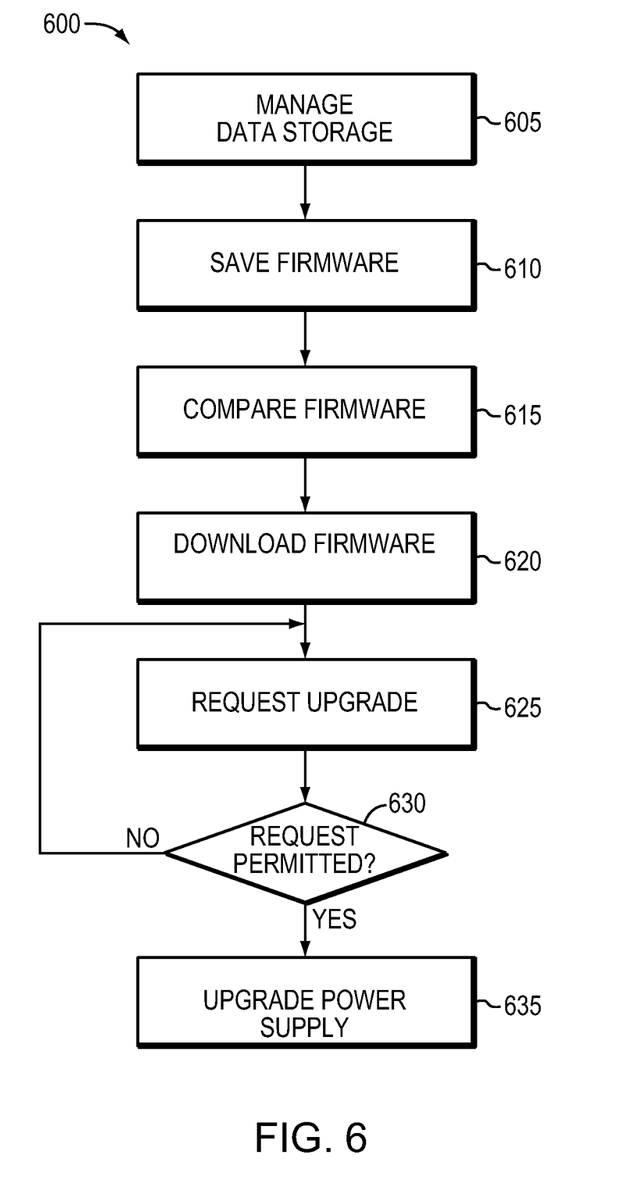
FIG. 6 is a flowchart of processing steps that may be performed in an embodiment in accordance with techniques herein.

Referring to FIG. 6, there is illustrated a further technique for use in upgrading firmware. The technique is indicated generally by the reference numeral 600. The technique comprises managing 605 data storage in a data storage system comprising a first enclosure having a first and a second storage processor and a first and a second power supply associated with one of the first and the second storage processor. In one embodiment, the technique described herein can be performed by logic operating on the first enclosure. The technique comprises saving 610 a firmware upgrade in at least one of the first and second storage processors. In this embodiment, the firmware upgrade is saved in both the first and second storage processors. The technique comprises comparing 615 the firmware upgrade in the first storage processor and existing firmware in the associated power supply as well as comparing 615 the firmware upgrade in the second storage processor and existing firmware in the associated power supply The technique comprises downloading 620 the firmware upgrade in the first and the second storage processors to the associated first and second power supply in response to the comparison determining a difference between the saved firmware upgrade in the first and the second storage processors and the firmware in the associated first and the second power supply. For example, the firmware upgrade may be downloaded to the power supply buffers of the respective power supply. The technique comprises the first and second storage processors requesting 625 permission to proceed with upgrading the firmware in the associated first and second power supply in response to downloading the firmware upgrade to the first and the second power supply. Essentially, the first and second storage processors and associated power supply are configured for co-operating with one another for enabling only one power supply to upgrade at a time. In one embodiment, the technique may be configured so that the power supply that receives the download in the power supply buffer first will be granted permission to proceed with commencement of upgrading firmware before the other power supply. For example, if the first power supply receives the download before the second power supply, the first power supply may be given permission to commence the firmware upgrade before the second power supply. It will be appreciated that by receiving the firmware upgrade first the request for permission to upgrade may be sent before the other request. The technique comprises upgrading 635 the power supply in response to receiving permission to proceed with the firmware upgrade. The other storage processor associated with the power supply not given permission will continue to request permission until such time as permission is received. The firmware will be upgraded 635 in the other of the first and second power supply in response to receiving the permission.

In one embodiment if the firmware upgrade is bad in connection with the power supply initially granted permission, a notice or command may be sent to the other storage processor and associated power supply to abort the upgrade. In such an embodiment the other storage processor and associated power will not be granted permission to proceed.

The advantage of upgrading only one power supply at a time is that when the power supply resets in order to enable the firmware upgrade, the enclosure is not in a DU situation as the other power supply is able to power the enclosure. Moreover, if the firmware upgrade is bad rendering the power supply inactive it may be possible to abort the upgrade in connection with the remaining power supply so as to avoid another potential DU situation.

Referring to FIG. 7, there is illustrated a further technique for use in upgrading firmware. It will be appreciated that FIG. 7 comprises two pages and that FIG. 7-2 is merely a continuation of FIG. 7-1. The technique is indicated generally by the reference numeral 700. The technique comprises managing 705 data storage in a data storage system comprising a plurality of enclosures, wherein at least one of the enclosures comprises a first and a second storage processor and a first and a second power supply associated with one of the first and the second storage processor. For example, the data storage system may comprise a DPE and a plurality of DAE daisy chained thereto. It will be appreciated from FIG. 2 that the DPE 130 may include two storage processors (134a, 134b) and two power supplies (138a, 138b). Moreover, it will be appreciated that the DAE 120 may include two power supplies (128a, 128b). In one embodiment the technique described herein can be performed by logic operating on the enclosures. The technique comprises saving 710 a firmware upgrade in the storage processors of the enclosure. The technique comprises creating 715 a queue of enclosures on the chain. In one embodiment, the queue may be created such that the queue starts from the last enclosure on the chain. Moreover, the technique comprises checking 720 each enclosure in the queue for a firmware revision or upgrade by comparing 720 the firmware upgrade in the storage processors and firmware in the power supply. It will be appreciated by those skilled in the art that the technique decides 725 to upgrade based on whether there is a difference between the firmware upgrade in the storage processors and the existing firmware in the power supply. If there is no difference between the firmware in the storage processors and power supply the technique decides there is no need to upgrade any of the power supplies and the technique ends 728. If there is a difference the technique reads the saved firmware upgrade 730 that is to be downloaded to the power supply and starts the download 735 of the firmware to the power supply. The technique checks 740 whether the download is successful. If it is determined that the download is not successful the technique will re-try the download again. In one embodiment, the technique will re-try a defined number of times. For example, the technique may re-try 745 the download twice in response to determining that the download was unsuccessful. It will be appreciated by those skilled in the art that the firmware can be downloaded to the power supplies of the enclosures at substantially the same time. However, the steps performed after downloading the firmware are performed one enclosure at a time starting with the first enclosure in the queue. If the download was successful in the first enclosure in the queue, the storage processor checks 750 if the other storage processor is present. If it is determined that the other storage processor is not present the technique will start upgrading 755 the firmware immediately in the power supply. For example, the other storage processor may not be present because it has failed. If the other storage processor is present, the technique sends 760 a message to the other storage processor for permission to proceed with the upgrade of the firmware in the power supply. The other storage processor will check 765 whether the power supply associated therewith is upgrading the firmware. If the other storage processor determines that the power supply is not upgrading firmware it will send 768 a "Yes" message to the requesting storage processor to start the firmware upgrade. The storage processor will start or initiate 755 the firmware upgrade in the power supply in response to receiving the message. If the other storage processor determines that the power supply is upgrading firmware it will send 770 a "No" message to the requesting storage processor and the requesting storage processor waits 772 for the upgrade to complete in response to receiving the negative message. The technique will determine 774 whether the upgrade in the power supply was successful and if the upgrade is not successful the other storage processor will send 776 a message to the storage processor that the firmware is bad. This will terminate the upgrade process. It will be appreciated that it is desirable to avoid upgrading the power supply with bad firmware upgrade as this would result in a potential DU situation. If it is determined that the upgrade was successful the other storage processor sends 778 a continue message to the storage processor that it is in order to continue with the firmware upgrade. The storage processor receives 780 the continue message and the upgrade 755 process is started or initiated in response to receiving the message. The technique as described herein continues to check 782 if the upgrade was successful. If the upgrade is successful the technique will move 784 to the next enclosure by checking if the download was successful 740 in connection with the next enclosure in the queue. If the firmware upgrade is not successful the storage processor will send 786 a message to the other storage processor that the firmware is bad.

While the above techniques illustrate and describe with respect to FIGS. 4 to 7 the step of saving a firmware upgrade in the storage processor(s) it will be appreciated that the steps thereafter may occur as a result of various events. In one embodiment the steps illustrated and described thereafter may occur in response to saving the firmware upgrade in the storage processor(s). In another embodiment, the steps may occur in response to the storage processor(s) rebooting. For example, the storage processor(s) may reboot in response to saving the firmware upgrade in the storage processor(s). In another embodiment, a command may be sent to initiate the steps. In a further embodiment, the steps may occur in response to a further enclosure being added to the data storage system. In a still further embodiment, the steps may occur in response to the addition of an extra power supply in one of the enclosures.

The advantages of the techniques described herein are many. Traditionally, the power supply was manually upgraded by removing the power supply to the lab and burning the firmware upgrade onto the power supply. This approach was costly, time consuming and inconvenient. The techniques as described herein overcome such difficulties.

Figure 8:
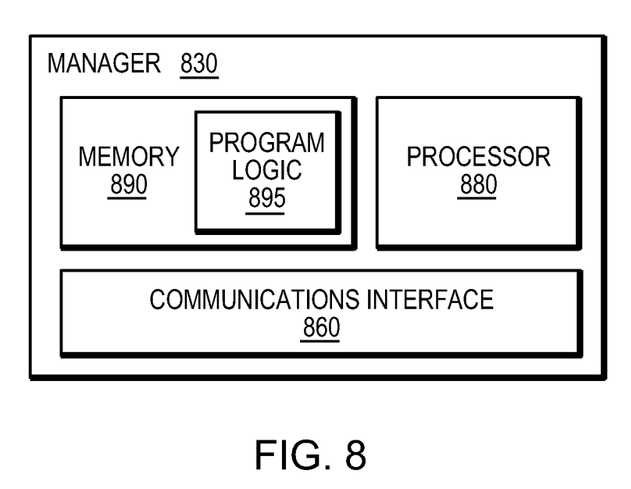
FIG. 8 is a block diagram of an example embodiment apparatus that may utilize the techniques described herein.

Referring to FIG. 8, there is shown a block diagram of an example embodiment manager 830 including a memory 890, program logic 895 stored in memory 890, a processor 880 and a communications interface 860. The methods and apparatus may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, the machine becomes an apparatus for practicing the techniques as described herein. When implemented on one or more general-purpose processors, the program code combines with such a processor to provide a unique apparatus that operates analogously to specific logic circuits. As such a general purpose digital machine can be transformed into a special purpose digital machine.

Figure 9:
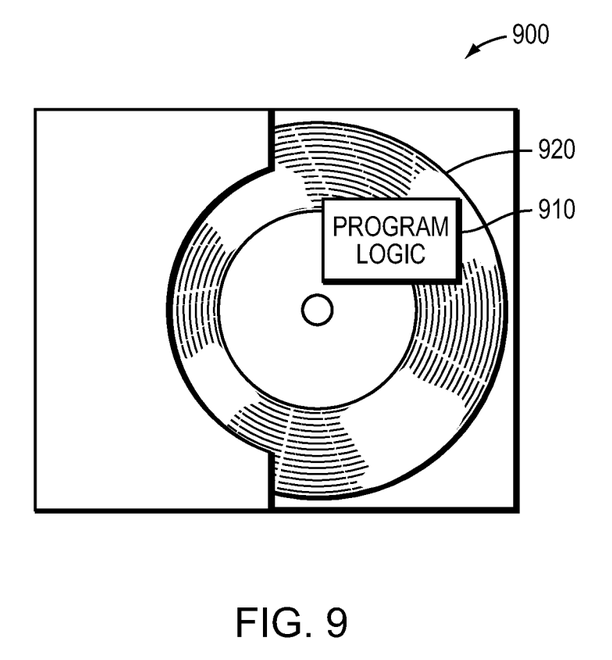
FIG. 9 is an example of an embodiment of a method embodied on a computer readable storage medium that may utilize the techniques described herein.
Figure 71:
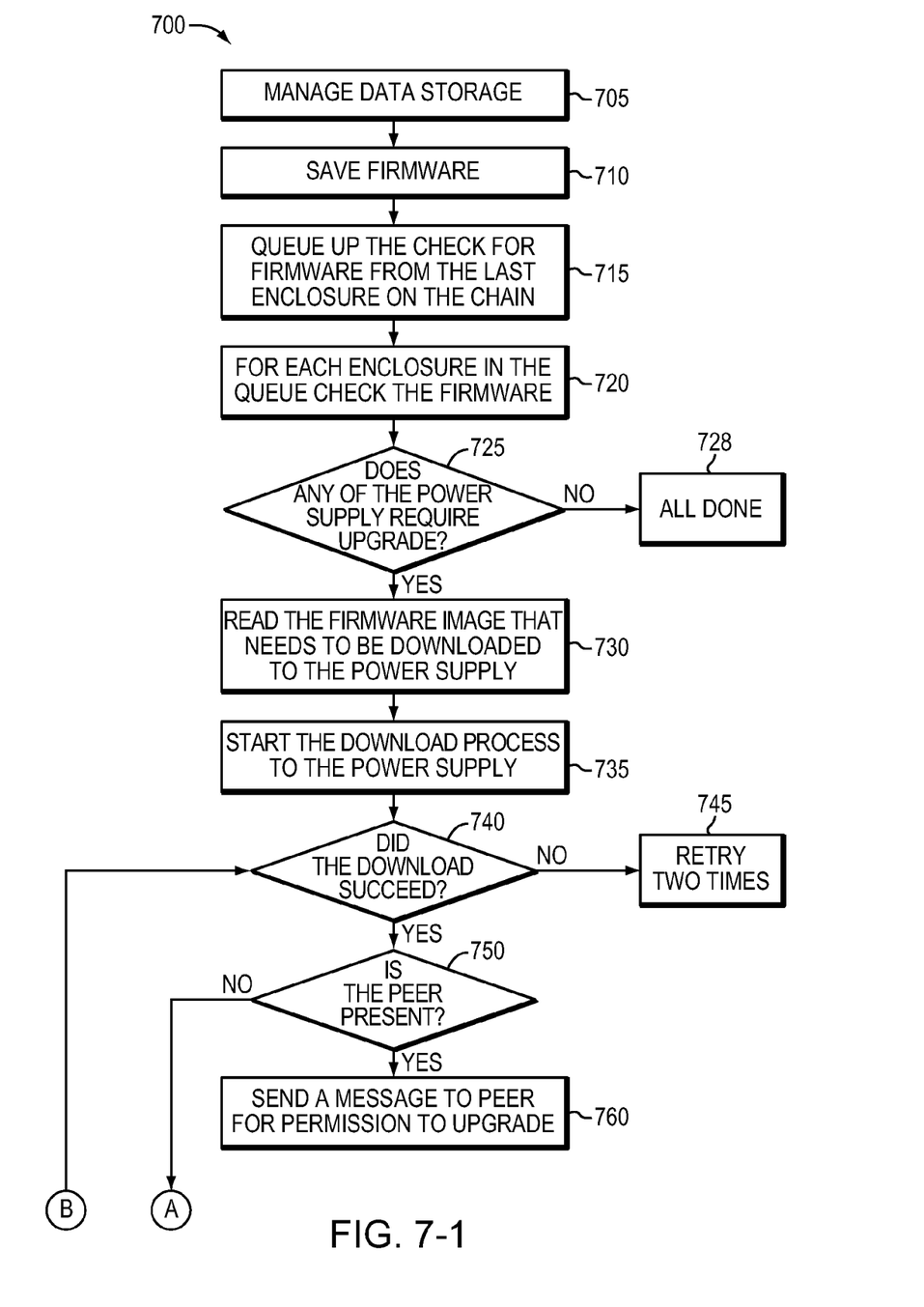
Figure 72:
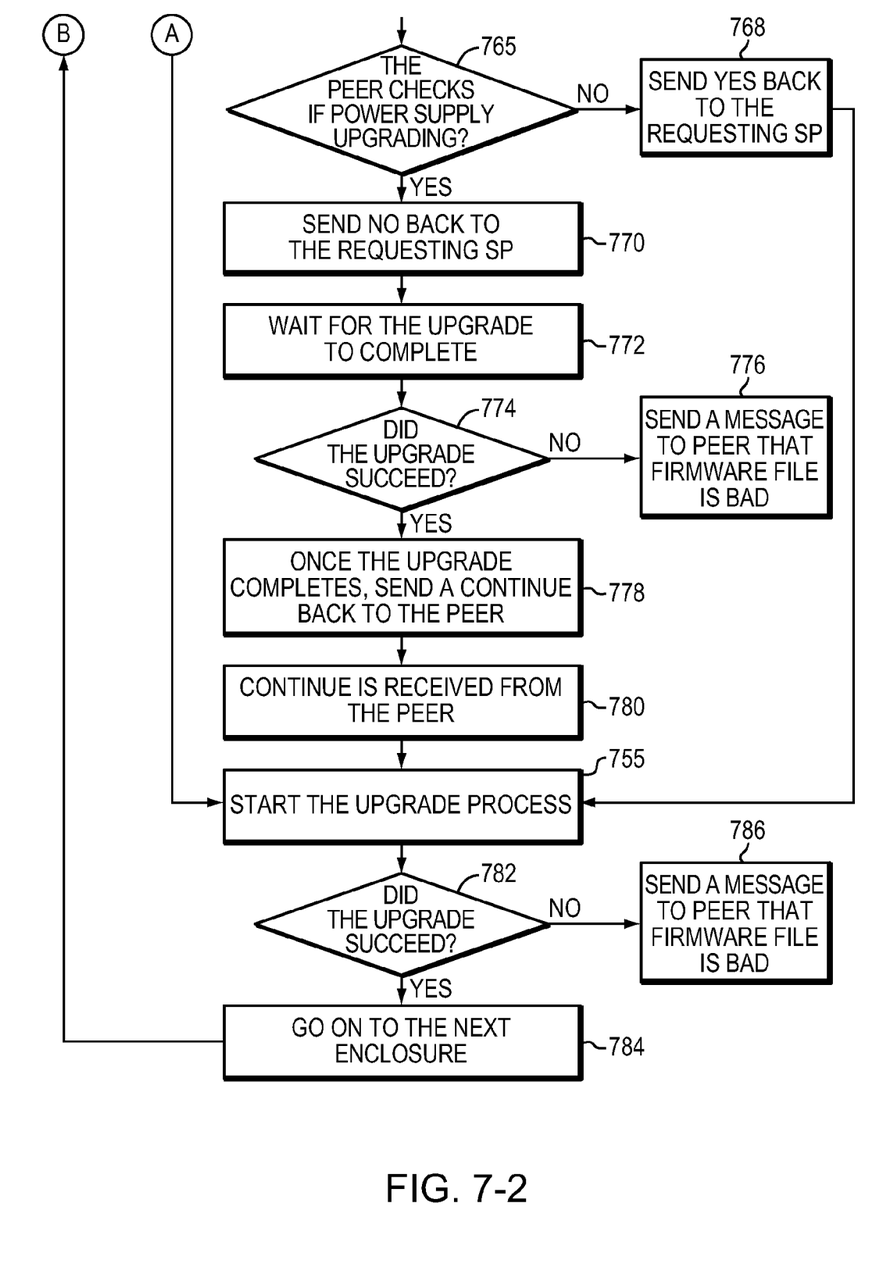

Referring to FIG. 9, there is shown program logic 910 embodied on a computer-readable medium 920, the logic encoded in computer-executable code configured for carrying out the techniques as described herein and forming a computer program product 900. The logic for carrying out the techniques may be embodied as part of the aforementioned system. For the purposes of illustration, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for upgrading firmware, the method comprising:
    managing data storage in a data storage system, wherein the data storage system comprises a first enclosure having a first power supply and a second power supply;
    saving firmware upgrade in the data storage system;
    comparing the firmware upgrade and firmware in the first and the second power supply;
    based on the comparison, determining that there is a difference between the firmware upgrade and the firmware in the first and the second power supply;
    requesting permission to initiate upgrade of the firmware in the first and second power supply;
    granting permission to initiate an upgrade of the firmware in the first power supply;
    delaying upgrade of the firmware in the second power supply;
    downloading the firmware upgrade to the first power supply;
    initiating the upgrade of the firmware in the first power supply, wherein the upgrade of the firmware comprises resetting the first power supply for enabling the firmware upgrade in the first power supply;
    determining whether the upgrade of the firmware in the first power supply is successful or unsuccessful; and
    based on the determination that the upgrade of the firmware in the first power supply is successful or unsuccessful, determining whether to grant or deny permission to initiate the upgrade of the firmware in the second power supply.

2. The method as claimed in claim 1, further comprising:
    based on a determination that there is a difference between the firmware upgrade and the firmware in the first power supply, holding Input/Output (I/O) operations.

3. The method as claimed in claim 2, wherein holding I/O operations in memory in a first storage processor.

4. The method as claimed in claim 2, wherein the I/O operations comprise read and write I/O operations.

5. The method as claimed in claim 3, further comprising:
    notifying memory in the first storage processor of the firmware upgrade in response to the completion of the firmware upgrade.

6. The method as claimed in claim 5, further comprising:
    receiving the notification of the firmware upgrade; and
    releasing the I/O operations from the memory in the first storage processor in response to the receipt of the notification of the firmware upgrade.

7. A system for upgrading firmware, the system comprising:
    first logic managing data storage in a data storage system, wherein the data storage system comprises a first enclosure having a first power supply and a second power supply;
    second logic saving firmware upgrade in the data storage system;
    third logic comparing the firmware upgrade and firmware in the first and the second power supply;
    based on the comparison, fourth logic determining that there is a difference between the firmware upgrade and the firmware in the first and the second power supply;
    fifth logic requesting permission to initiate upgrade of the firmware in the first and second power supply;
    sixth logic granting permission to initiate the upgrade of the firmware in the first power supply;
    seventh logic delaying upgrade of the firmware in the second power supply;
    eighth logic downloading the firmware upgrade to the first power supply;
    ninth logic initiating the upgrade of the firmware in the first power supply, wherein the upgrade of the firmware comprises resetting the first power supply for enabling the firmware upgrade in the first power supply;
    tenth logic determining whether the upgrade of the firmware in the first power supply is successful or unsuccessful; and
    based on the determination that the upgrade of the firmware in the first power supply is successful or unsuccessful, eleventh logic determining whether to grant or deny permission to initiate the upgrade of the firmware in the second power supply.

8. A computer program product for upgrading firmware, the computer program product being embodied in a non-transitory computer readable storage medium and comprising instructions for:

managing data storage in a data storage system, wherein the data storage system comprises a first enclosure having a first power supply and a second power supply;

saving firmware upgrade in the data storage system;

comparing the firmware upgrade and firmware in the first and the second power supply;

based on the comparison, determining that there is a difference between the firmware upgrade and the firmware in the first and the second power supply;

requesting permission to initiate upgrade of the firmware in the first and second power supply;

granting permission to initiate upgrade of the firmware in the first power supply;

delaying upgrade of the firmware in the second power supply;

downloading the firmware upgrade to the first power supply;

initiating the upgrade of the firmware in the first power supply, wherein the upgrade of firmware comprises resetting the first power supply for enabling the firmware upgrade in the first power supply; and determining whether the upgrade of the firmware in the first power supply is successful or unsuccessful; and based on the determination that the upgrade of the firmware in the first power supply is successful or unsuccessful, determining whether to grant or deny permission to initiate the upgrade of the firmware in the second power supply.

\* \* \* \* \*